United States Patent
Nishi et al.

[11] Patent Number: 6,154,696
[45] Date of Patent: Nov. 28, 2000

[54] STEERING CONTROL SYSTEM FOR CONTROLLING TORQUE STEER

[75] Inventors: Yutaka Nishi; Yasuharu Oyama; Yasuji Shibahata; Takashi Nishimori; Kazushige Sugamata; Hiroyuki Kawagoe, all of Wako, Japan

[73] Assignee: Honda Giken Kogyo Kabushiki Kaisha, Toyko, Japan

[21] Appl. No.: 09/184,971

[22] Filed: Nov. 3, 1998

[30] Foreign Application Priority Data

Nov. 4, 1997 [JP] Japan .................................. 9-302155

[51] Int. Cl.$^7$ ............................... G06F 7/00; G06F 17/00; G06F 19/00
[52] U.S. Cl. ........................... 701/41; 180/233; 180/443; 180/446; 180/421; 180/422; 180/444; 701/42
[58] Field of Search ........................ 701/41, 42; 475/204, 475/206, 205, 225; 180/233, 443, 446, 421, 422, 444

[56] References Cited

U.S. PATENT DOCUMENTS

| | | | |
|---|---|---|---|
| 4,509,611 | 4/1985 | Kade et al. .............................. | 180/79.1 |
| 4,972,320 | 11/1990 | Sugiura et al. ..................... | 364/424.05 |
| 4,973,296 | 11/1990 | Shibahata ................................. | 475/231 |
| 5,000,278 | 3/1991 | Morishita ................................ | 180/79.1 |
| 5,482,133 | 1/1996 | Iwata et al. .............................. | 180/197 |
| 5,513,720 | 5/1996 | Yamamoto et al. ..................... | 180/141 |
| 5,528,497 | 6/1996 | Yamamoto et al. .. | |
| 5,612,877 | 3/1997 | Shimizu et al. ................. | 364/424.051 |
| 5,692,987 | 12/1997 | Shibahata et al. .. | |
| 5,703,775 | 12/1997 | Yamamoto et al. .. | |
| 5,774,819 | 6/1998 | Yamamoto et al. .. | |
| 5,845,222 | 12/1998 | Yamamoto et al. ...................... | 701/41 |
| 6,022,226 | 12/1999 | Collier-Hallman et al. ............ | 318/439 |
| 6,032,755 | 3/2000 | Blandino et al. ....................... | 180/446 |

*Primary Examiner*—William A. Cuchlinski, Jr.
*Assistant Examiner*—Ronnie Mancho
*Attorney, Agent, or Firm*—Armstrong, Westerman, Hattori, McLeland & Naughton

[57] ABSTRACT

In a steering control system for controlling torque steer in a vehicle equipped with an electric power steering device and a torque split arrangement for individually controlling traction and/or braking force of right and left wheels, a difference in traction and/or braking force between the right and left wheels which may be produced by the torque split arrangement may give rise to torque steer depending on the geometry of the wheel suspension system of the vehicle. The control unit for the electric power steering device additionally receives an additional signal for providing an additional steering torque which is required for canceling the torque steer. Thus, the torque steer can be eliminated both economically and reliably without requiring to modify the wheel suspension system.

3 Claims, 6 Drawing Sheets

STEERING CONTROL SYSTEM FOR CONTROLLING TORQUE STEER

TECHNICAL FIELD

The present invention relates to a steering control system for a vehicle equipped with an electric power steering device, and in particular to such a steering control system for a vehicle which is capable of splitting traction and/or braking force between right and left wheels at a selected ratio.

BACKGROUND OF THE INVENTION

Various proposals have been made to improve the cornering performance of road vehicles. One example can be found in the electric power steering device which minimizes the effort required for the vehicle operator to steer the vehicle by providing a steering assist torque using an electric motor. It has also been proposed to detect the dynamic states of the vehicle such as the lateral acceleration and the yaw rate by using appropriate sensors, and to apply a reactive steering torque by using an electric power steering device so as to control such dynamic states. For such a reactive steering control, reference should be made to U.S. Pat. Nos. 5,528,497, 5,703,775, and 5,774,819 which are assigned to the common assignee, and the contents of these patents are hereby incorporated in this application by reference.

According to yet another proposal, the distribution of the traction and/or braking force between the right and left wheels is changed as desired so as to apply a yaw moment to the vehicle. It can be favorably utilized to improve the maneuverability and stability of the vehicle. For such a torque splitting arrangement, reference should be made to U.S. Pat. No. 5,692,987 which is assigned to the common assignee, and the contents of this patent are hereby incorporated in this application by reference.

According to the proposal to control the distribution of the traction and/or braking force between the right and left wheels, it was however found that a certain steering torque is produced when the right and left wheels are subjected to different traction and/or braking forces. This phenomenon which is sometimes called as torque steer is due to the unevenness in the moment around the kingpin between the right and left wheels as illustrated in FIG. 6, and can be eliminated by changing the suspension geometry so that the traction or braking force would not produce a moment around the kingpin. This however significantly complicates the design of the wheel suspension system, and reduces the freedom in design.

BRIEF SUMMARY OF THE INVENTION

In view of such problems of the prior art, and the recognition by the inventors, a primary object of the present invention is to provide a steering control system which can control the torque steer both economically and reliably.

A second object of the present invention is to provide a steering control system which can remove the torque steer without regard to the configuration of the wheel suspension system.

According to the present invention, these and other objects can be accomplished by providing a steering control system for controlling torque steer in a vehicle equipped with an electric power steering device and a torque split arrangement for individually controlling traction and/or braking force of right and left wheels, comprising: a torque difference input unit for receiving a torque difference signal corresponding to a difference in traction and/or braking force between the right and left wheels; a torque steer canceling steering torque determining unit for producing a torque steer canceling steering torque signal that is required to cancel a steering torque arising from the difference in traction and/or braking force between the right and left wheels; and a drive circuit for supplying a drive current to the electric power steering device according to the torque steer canceling steering torque signal.

The magnitude of torque steer that arises under various conditions can be either experimentally obtained or computed in advance, and the torque steer canceling steering torque determining unit provides the steering torque that is required to cancel the torque steer. To simplify the arrangement, and minimize the resource and time required for the necessary computation, the torque steer canceling steering torque determining unit may be provided with a look-up table which associates a difference in traction and/or braking force between the right and left wheels with a steering torque that is required to cancel the torque steer due to the difference in traction and/or braking force. Thus, the torque steer can be effectively canceled with a simple and economical arrangement.

If the system is additionally provided with a reactive steering assist torque control unit for producing a reactive steering assist control signal which is added to the torque steer canceling steering torque signal, the reactive steering assist control signal providing a reactive steering assist torque which contributes to steering the vehicle so as to achieve a reference behavior under given conditions, any errors that may be produced in the process of obtaining the proper canceling steering torque can be complemented by the action of the reactive steering assist torque control unit to correct any deviation of the motion of the vehicle from a standard or reference behavior that may arise due to such errors.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
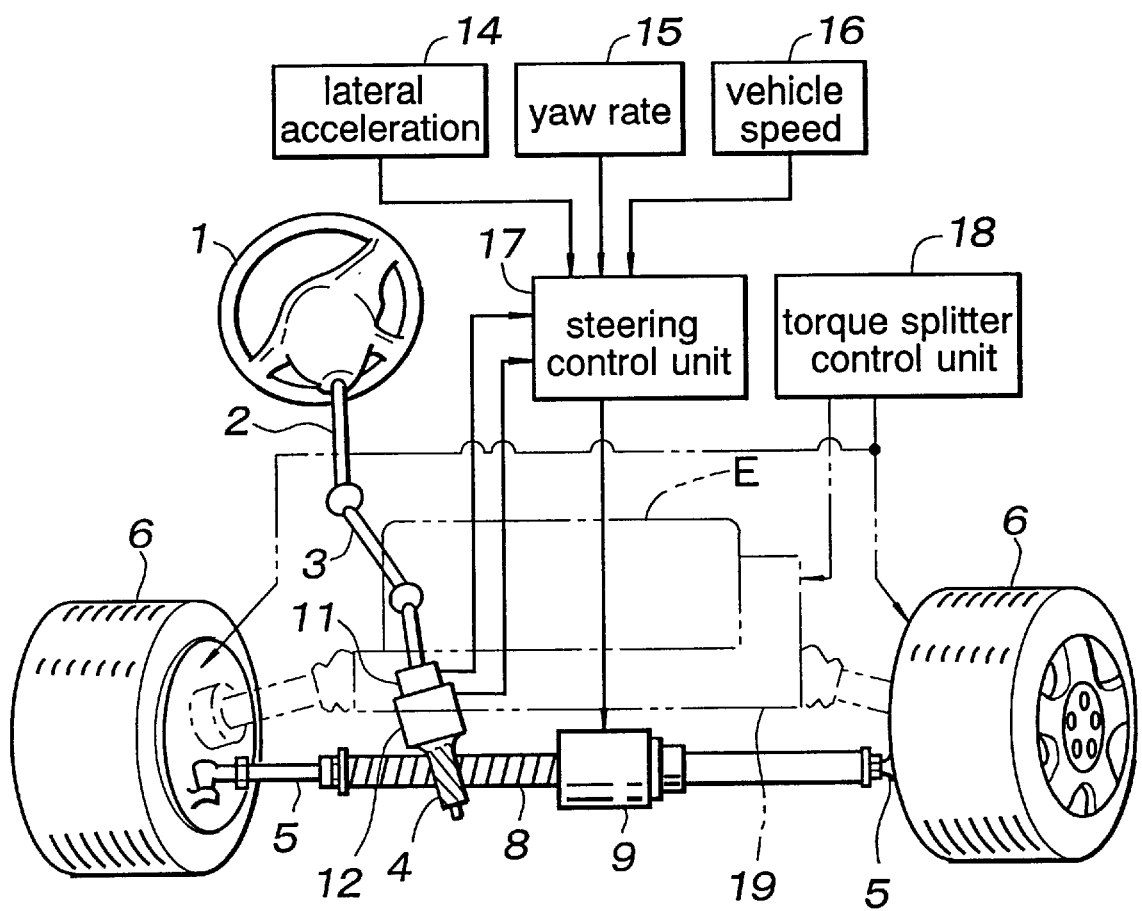
FIG. 1 is a schematic view of a vehicle steering system embodying the present invention.

FIG. 1 schematically illustrates the overall structure of a vehicle steering system embodying the present invention. A steering wheel 1 is integrally attached to an upper end of a steering shaft 2, and a pinion 4 is connected to a lower end of the steering shaft 2 via a connecting shaft 3 incorporated with universal joints. The pinion 4 meshes with a rack shaft 8 which extends laterally across the width of the vehicle body, and connected to knuckle arms of right and left front wheels 6 via tie rods 5 at either end thereof. The structure described so far constitutes a known rack and pinion steering mechanism. An electric motor 9 having a hollow output shaft is coaxially disposed in an intermediate part of the rack shaft 8 so as to apply an assist force to the rack shaft 8 and reduce the effort required to steer the vehicle.

The system further comprises a steering angular speed sensor 11 for detecting the angular speed of the steering wheel 1 at the rack and pinion mechanism, a steering torque sensor 12 for detecting the manual steering torque acting upon the pinion 4, a lateral acceleration sensor 14 attached to a suitable location of the vehicle, typically near its center of gravity, for producing a signal corresponding to the lateral acceleration of the vehicle, a yaw rate sensor 15 for producing a signal corresponding to the yaw rate (yawing angular speed) of the vehicle, a vehicle speed sensor 16 for producing a signal corresponding to a traveling speed of the vehicle, and a steering control unit 17 for controlling the output of the electric motor 9 according to the outputs of these sensors.

This vehicle is provided with a torque splitter 19 which allows the traction and/or braking force of the right and left wheels to be controlled individually. In this embodiment, only the right and left front wheels are controlled by the torque splitter 19. As one can readily appreciate, this torque splitter 19 can be extended so as to individually control, additionally or alternatively, the right and left rear wheels.

Figure 2:
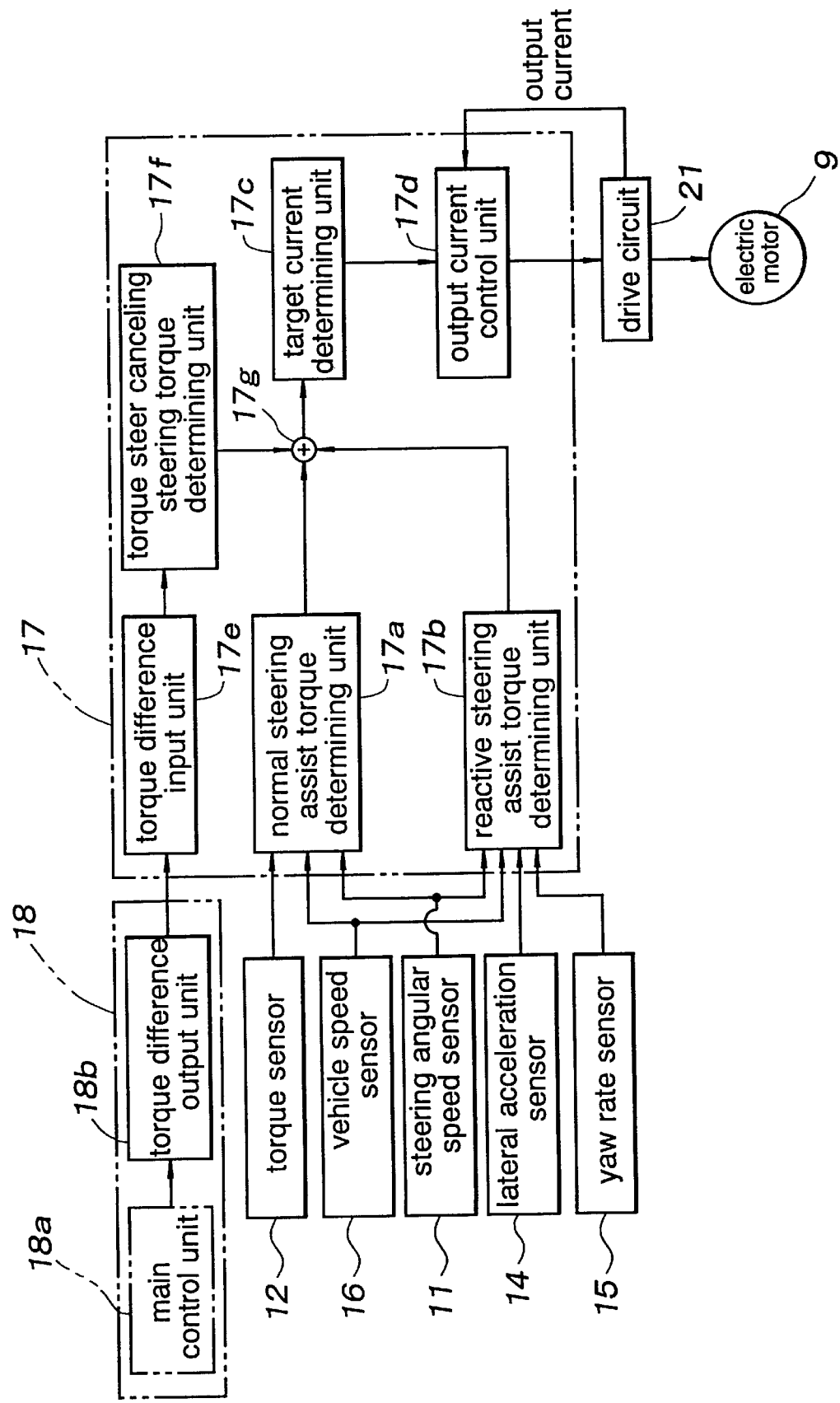
FIG. 2 is a block diagram of the control arrangement for the vehicle steering system of FIG. 1.

Referring to FIG. 2, a torque splitter control unit 18 is provided in association with the torque splitter 19, and this control unit 18 essentially consists of a main control unit 18*a* and a torque difference output unit 18*b* for actually producing a torque difference signal according to the output from the main control unit 18*a*. The torque splitter control unit 18*a* controls the torque splitter 19 which, in this case, is interposed between an engine E and the right and left front wheels 6.

The steering control unit 17 comprises a normal steering assist torque determining unit 17*a* for computing a normal steering assist torque, and a reactive steering assist torque determining unit 17*b* for computing a reactive steering assist torque which would be desired for controlling the motion of the vehicle, in particular the lateral and yaw motion of the vehicle. The normal steering assist torque determining unit 17*a* receives output signals from the steering torque sensor 12 for measuring the manual steering torque applied to the steering wheel 1, the vehicle speed sensor 16, and the steering angular speed sensor 11, and conducts normal steering assist torque control. The reactive steering assist torque control unit 17*b* receives output signals from the steering angular speed sensor 11, the lateral acceleration sensor 14, the yaw rate sensor 15, and the vehicle speed sensor 16, and compare these values with reference values so as to determine if and how much the behavior of the vehicle deviates from a reference behavior. When any significant deviation is detected, the reactive steering assist torque determining unit 17*b* supplies a control signal to the electric motor 9 so as to counteract such a deviation by feedback control. For details of such torque splitting control or a mechanical arrangement therefor, reference should be made to U.S. Pat. No. 5,692,987 issued to Shibahata et al. and assigned to the common assignee.

The steering control unit 17 also comprises a target current determining unit 17*c* for determining a target current for the electric motor 9 according to the torque signals supplied from the normal steering assist torque determining unit 17*a* and the reactive steering assist torque determining unit 17*b*, and an output current control unit 17*d* for controlling the electric current actually supplied to the electric motor 9 according to the thus obtained target current. The current control signal from the output current control unit 17*d* is supplied to a drive circuit 21, and then to the electric motor 9, and a feedback control path is formed between the drive circuit 21 and the output current control unit 17*d*.

The steering control unit 17 further comprises a torque difference input unit 17*e* for receiving the torque difference signal from the torque difference output unit 18*b*, and a torque steer canceling steering torque determining unit 17*f* for producing a torque steer canceling steering torque signal that is required to cancel the torque steer according to the difference signal supplied from the torque difference input unit 17*e*. This torque steer canceling steering torque signal is applied to an adder 17*g* along with the normal steering assist torque signal and the reactive steering assist torque signal to be additively forwarded to the target current determining unit 17*c*.

Figure 3:
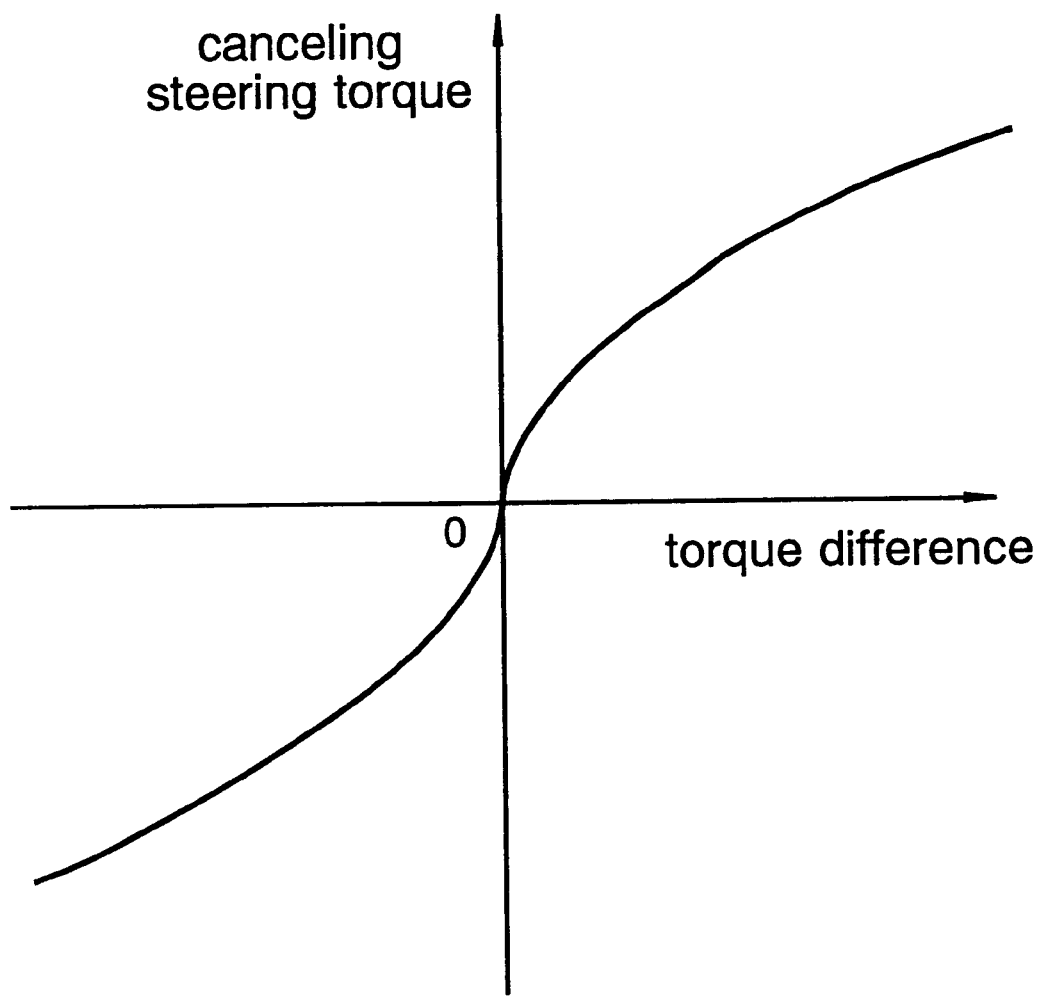
FIG. 3 is a graph conceptually representing the table for associating the magnitude of steering torque that is require for canceling the torque steer with the difference in traction or braking force between the right and left wheels.

FIG. 3 conceptually shows a typical relationship between the torque difference signal and the torque steer canceling steering torque signal at the torque steer canceling steering torque determining unit 17*f*. In this case, the increase in the torque steer canceling steering torque signal with the increase in the difference signal is somewhat reduced as the difference signal increases so that the vehicle operator may be made aware of the state of the vehicle or so that the non-linearity of the system may be fully taken into account.

Figure 4:
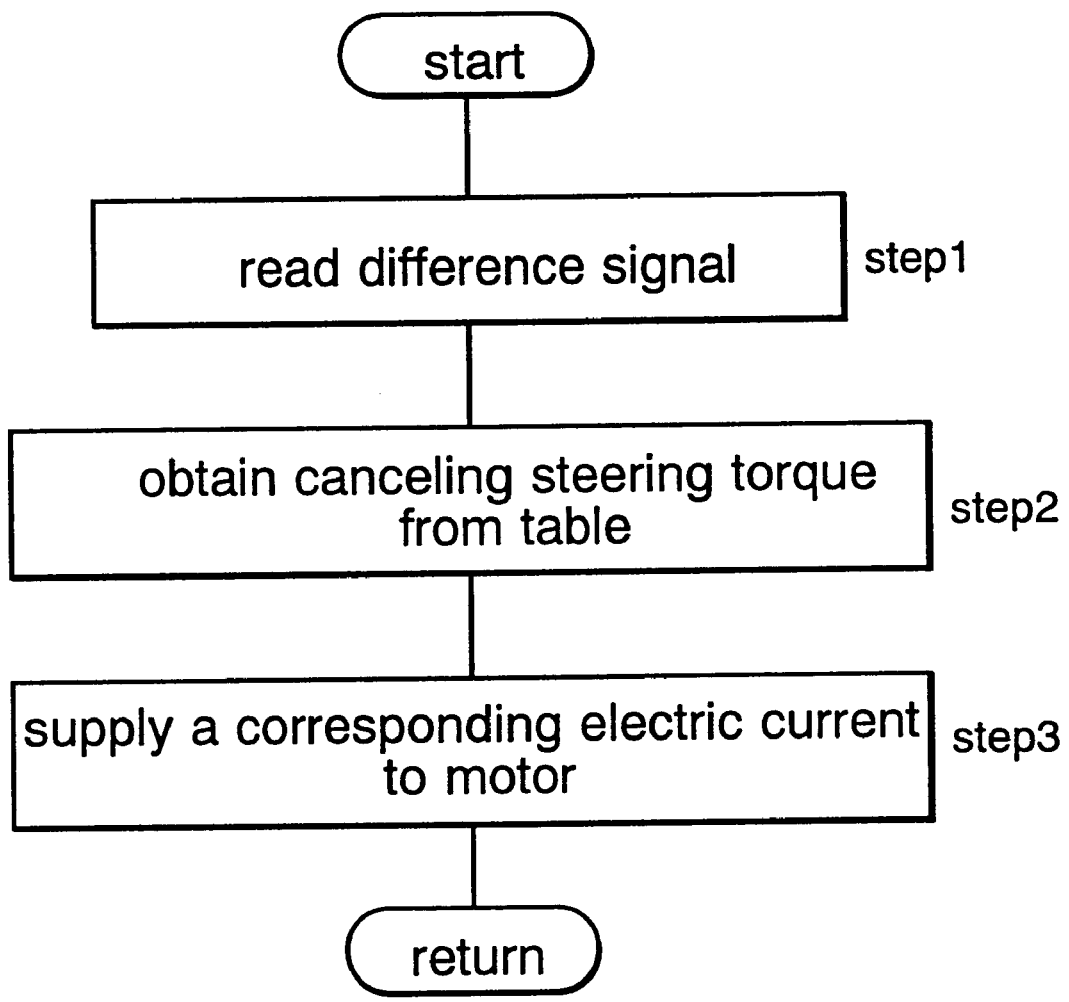
FIG. 4 is a flow chart of the control process for producing the steering torque for canceling the torque steer.

FIG. 4 shows a typical control flow for determining the torque steer canceling steering torque. First of all, the difference signal produced from the torque splitter control unit 18 or the torque difference output unit 18*b* thereof is received by the torque difference input unit 17*e* in step ST1. The torque steer canceling steering torque determining unit 17*f* then produces a torque steer canceling steering torque according to a table as characterized by the graph of FIG. 3 in step ST2. The output from the torque steer canceling steering torque determining unit 17*f* is forwarded to the target current determining unit 17*c*, and this in turn causes a corresponding electric current to be supplied to the electric motor 9 in step ST3.

By repeating this procedure, a torque steer canceling action is taken as soon as any difference in traction or braking force is detected between the right and left wheels. More specifically, it can be pre-calibrated how much torque steer would be produced for a given difference in traction or braking force between the right and left wheels for the particular suspension system used either experimentally or theoretically, and such data can be incorporated in the table of the torque steer canceling steering torque determining unit 17*f*. By looking up such a table when controlling the electric motor 9, it is possible to cancel the torque steer with an adequate promptness.

The torque steer canceling control according to the present invention is based on the linear addition of the torque steer canceling steering torque signal to the normal steering assist torque signal and the reactive steering assist torque signal, and can perform its function without interfering with the normal assist steering control and the reactive assist steering control. In particular, the combination of the torque steer canceling control and the reactive assist steering control is advantageous for the following reason. The torque steer canceling control may involve control errors for various reasons, and such control errors would result in the deviation of the motion of the vehicle from a standard motion.

Figure 5:
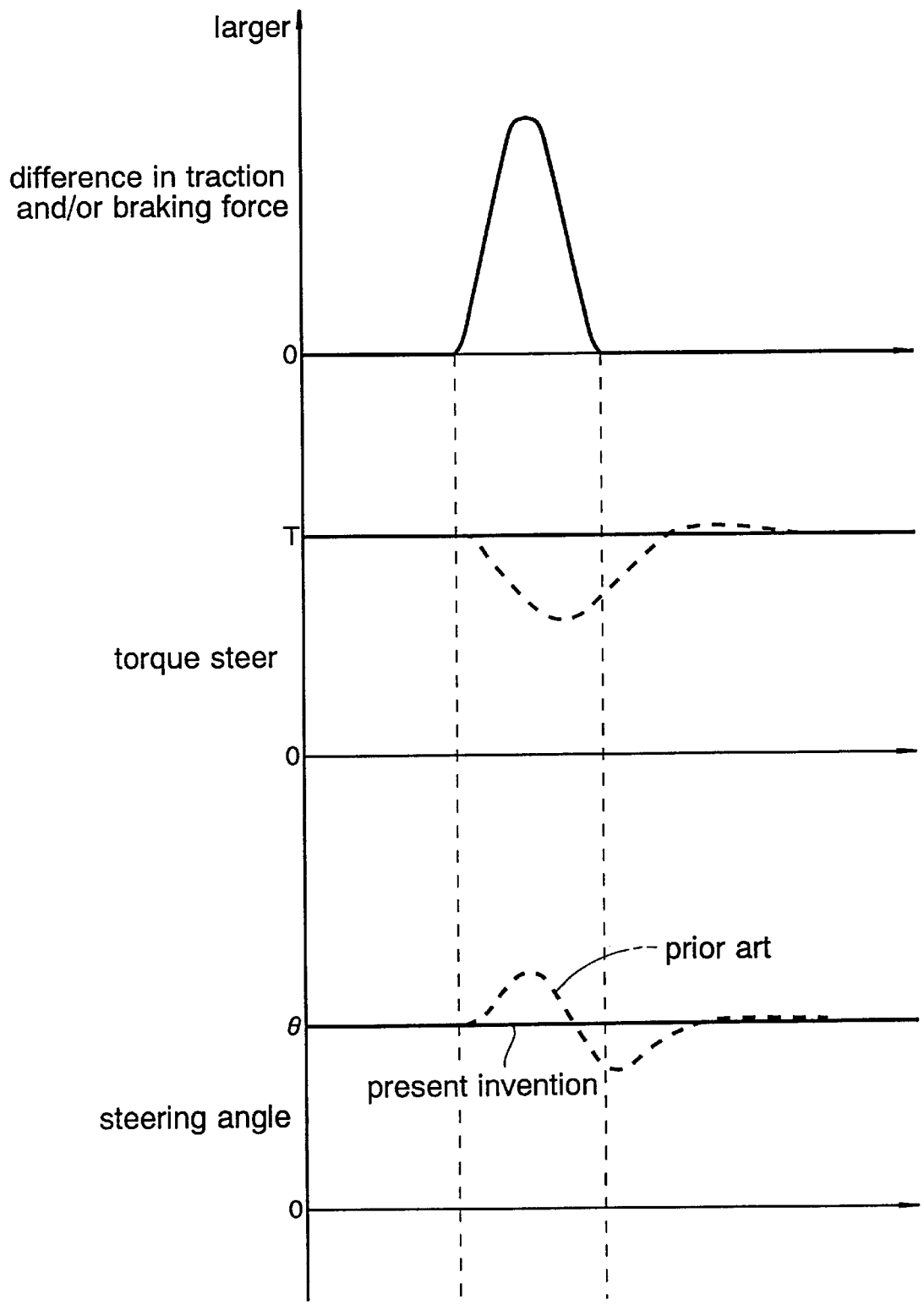
FIG. 5 is a time chart showing the operation of the present invention.
Figure 6:
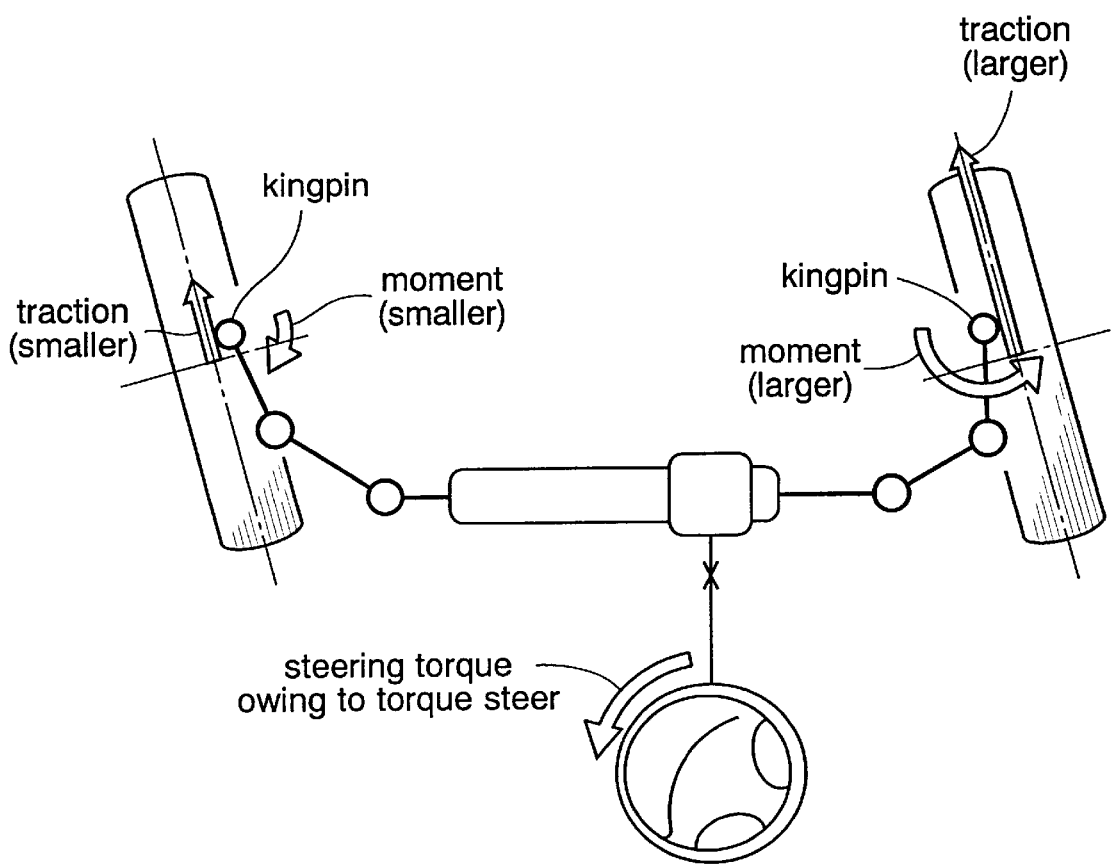
FIG. 6 is a diagram for illustrating the cause of the torque steer.

The resulting deviation of the motion of the vehicle is detected from the lateral acceleration and/or yaw rate, and the reactive assist steering control would provide a steering torque which counteracts such a deviation. Therefore, the reactive assist steering control, when combined with the torque steer canceling control, performs the function of complementing the torque steer canceling control. FIG. 5 is a time chart of a simulation for showing the operation of the present embodiment. When a normal passenger vehicle is turning a curve at an intermediate speed, and a pulse-shaped torque difference is applied to the right and left wheels as shown in the uppermost waveform of FIG. 5, a corresponding torque steer is produced and superimposed on the steady-state steering torque T as indicated by the waveform shown in the middle part of FIG. 5. The resulting steering torque would cause a transient change in the steering angle θ as indicated by the lowermost dotted-line waveform even when the steering wheel is held with a normal firmness. However, according to the present invention, the steering torque due to the torque steer is canceled, and no change in the steering angle is produced at the steering wheel as indicated by the lowermost solid-line waveform of FIG. 5. In this case, it was assumed that there was no deviation of the output signal of the torque difference input unit 17e from the signal corresponding to the actual difference in traction between the right and left wheels.

Thus, according to the present invention, the torque steer can be eliminated without modifying the geometry of the suspension system. The above described embodiment was directed to the control of torque steer when the right and left wheels are subjected to different magnitudes of traction, but as can be readily appreciated by a person skilled in the art, the present invention can be equally applicable to the control of the torque steer when the right and left wheels are subjected to different magnitudes of braking force.

Although the present invention has been described in terms of preferred embodiments thereof, it is obvious to a person skilled in the art that various alterations and modifications are possible without departing from the scope of the present invention which is set forth in the appended claims.

What is claimed:

1. A steering control system for controlling torque steer in a vehicle equipped with an electric power steering device and a torque split arrangement for individually controlling traction and/or braking force of right and left wheels, comprising:

a torque difference input unit for receiving a torque difference signal corresponding to a difference in traction and/or braking force between the right and left wheels;

a torque steer canceling steering torque determining unit for producing a torque steer canceling steering torque signal that is required to cancel a steering torque arising from the difference in traction and/or braking force between the right and left wheels; and a drive circuit for supplying a drive current to the electric power steering device according to said torque steer canceling steering torque signal.

2. A steering control system for controlling torque steer according to claim 1, further comprising a reactive steering assist torque control unit for producing a reactive steering assist control signal which is added to said torque steer canceling steering torque signal, said reactive steering assist control signal providing a reactive steering assist torque which contributes to steering the vehicle so as to achieve a reference behavior under given conditions.

3. A steering control system for controlling torque steer according to claim 1, wherein said torque steer canceling steering torque determining unit is provided with a look-up table which associates a difference in traction and/or braking force between the right and left wheels with a steering torque that is required to cancel the torque steer due to said difference in traction and/or braking force.

\* \* \* \* \*